United States Patent
Bromley et al.

(10) Patent No.: US 9,621,341 B2
(45) Date of Patent: Apr. 11, 2017

(54) ANONYMOUS VERIFIABLE PUBLIC KEY CERTIFICATES

(75) Inventors: Dennis N. Bromley, Issaquah, WA (US); Alexandre V. Grigorovitch, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1457 days.

(21) Appl. No.: 12/324,647

(22) Filed: Nov. 26, 2008

(65) Prior Publication Data

US 2010/0131765 A1    May 27, 2010

(51) Int. Cl.
  *H04L 29/06* (2006.01)
  *H04L 9/00* (2006.01)
  *H04L 9/32* (2006.01)

(52) U.S. Cl.
  CPC .......... *H04L 9/006* (2013.01); *H04L 9/3263* (2013.01); *H04L 63/0414* (2013.01); *H04L 63/0823* (2013.01); *H04L 2209/42* (2013.01); *H04L 2209/603* (2013.01)

(58) Field of Classification Search
  CPC ... H04L 9/006; H04L 9/3263; H04L 63/0414; H04L 2209/603; H04L 2209/42; H04L 63/0823
  USPC ........................................ 379/32.03; 713/175
  See application file for complete search history.

(56) References Cited

U.S. PATENT DOCUMENTS

| | | | |
|---|---|---|---|
| 5,511,121 A | 4/1996 | Yacobi | |
| 5,606,617 A | 2/1997 | Brands | |
| 5,864,667 A | 1/1999 | Barkan | |
| 6,212,635 B1 | 4/2001 | Reardon | |
| 6,299,062 B1* | 10/2001 | Hwang | G06F 21/33 235/379 |
| 6,598,161 B1* | 7/2003 | Kluttz et al. | 713/166 |
| 7,068,789 B2 | 6/2006 | Huitema et al. | |
| 7,366,897 B2* | 4/2008 | Noble | 713/156 |

(Continued)

OTHER PUBLICATIONS

Oishi, Kazuomi, "Unconditionally Anonymous Public-Key Certificates and their Applications", Retrieved at <<http://citeseer.ist.psu.edu/cache/papers/cs/20787/http:zSzzSzwww.cs.ucsb.eduzSzAbstractszSzdocszSzMSCS99-04.pdf/oishi99unconditionally.pdf>>, Aug. 1999, pp. 55.

(Continued)

*Primary Examiner* — Mahfuzur Rahman
(74) *Attorney, Agent, or Firm* — Karin L. Williams; Mayer & Williams PC

(57) ABSTRACT

The anonymity of a user at a client computer may be preserved when authenticating with an on-line service or content provider through the use of an anonymous and verifiable (i.e., "blind") certificate set that is created by a certificate authority from a fixed-size set of PKI key pairs. The certificate authority randomly selects a subset of PKI key pairs to generate the blind certificate set where each certificate in the set includes a respective public key from the PKI key pair subset. The certificate authority also sends the private keys from the PKI key pair subset to the user. During authentication, the client computer is configured to randomly select a subset of one or more certificates from the set to present to the provider. The provider will encrypt content using the public keys in the subset of certificates and the client will decrypt the content with the corresponding private keys.

21 Claims, 6 Drawing Sheets

(56) References Cited

U.S. PATENT DOCUMENTS

| | | |
|---|---|---|
| 2003/0177351 A1* | 9/2003 | Skingle .................. 713/156 |
| 2004/0088548 A1* | 5/2004 | Smetters et al. ............ 713/175 |
| 2004/0186999 A1 | 9/2004 | Kim et al. |
| 2004/0210597 A1* | 10/2004 | Wanish .................. 707/102 |
| 2005/0055548 A1* | 3/2005 | Micali .................... 713/158 |
| 2005/0066164 A1 | 3/2005 | Simon |
| 2006/0020783 A1* | 1/2006 | Fisher .................... 713/156 |
| 2006/0129815 A1* | 6/2006 | Baldwin ............... H04L 9/12 |
| | | 713/168 |
| 2006/0155985 A1 | 7/2006 | Canard et al. |
| 2007/0005965 A1* | 1/2007 | Nalliah et al. ............ 713/168 |
| 2007/0143608 A1 | 6/2007 | Zeng et al. |
| 2007/0179901 A1* | 8/2007 | Kresina .................. 705/60 |
| 2007/0223702 A1* | 9/2007 | Tengler et al. ............ 380/270 |
| 2008/0010451 A1* | 1/2008 | Holtzman et al. ......... 713/158 |
| 2008/0028206 A1* | 1/2008 | Sicard et al. ............. 713/156 |
| 2008/0148067 A1* | 6/2008 | Sitrick et al. ............. 713/193 |
| 2008/0209575 A1* | 8/2008 | Conrado et al. ........... 726/29 |
| 2008/0263354 A1* | 10/2008 | Beuque et al. ............ 713/158 |
| 2009/0046854 A1* | 2/2009 | Di Crescenzo et al. ...... 380/44 |
| 2009/0055642 A1* | 2/2009 | Myers et al. ............. 713/155 |
| 2009/0086977 A1* | 4/2009 | Berggren ................ 380/279 |
| 2009/0182667 A1* | 7/2009 | Parkes et al. ............. 705/50 |
| 2010/0031025 A1* | 2/2010 | Zhang et al. ............. 713/156 |

OTHER PUBLICATIONS

Wibowo, et al., "Versatile Anonymous, Fair and Off-line Hybrid Payment System", Retrieved at <<http://www.geocities.com/amwibowo/resource/hips.pdf>>, pp. 20.

* cited by examiner

ANONYMOUS VERIFIABLE PUBLIC KEY CERTIFICATES

BACKGROUND

The popularity of on-line services has grown due, at least in part, to the increased availability and reliability of broadband connectivity over the Internet. Typically, users can conveniently access a wide variety of available offerings. For example, users can participate in social networking, download music and video, search the Internet for information and resources, engage in banking and other financial transactions, make purchases of goods and services, take on-line classes and/or develop skills, play games or engage in other entertainment on their own or with other on-line users, communicate with other users around the world, and perform other activities and tasks.

In order to gain access to an on-line service in some cases, it may be necessary for users to establish their identity with the service provider through a process called authentication. Authentication is commonly performed through the use of logon credentials such as a user ID and password. If the user has knowledge of the credentials, it can be assumed that the user is authentic and legitimate. One weakness of using only logon credentials is that they are susceptible to being accidentally revealed, lost, or stolen. As a result, some services may require a more in-depth authentication process that relies upon a digital certificate that is issued and verified by a certificate authority using what is known as public key infrastructure ("PKI") security model which relies upon asymmetric (i.e., public key) cryptography. Under PKI, a private key is used for digital signing and authentication, and the certificates are used to distribute a public key portion of a PKI key pair.

But while a unique certificate can provide evidence that a user has the right to access an on-line service, under current PKI methodologies, the certificate is vulnerable to being used to improperly identify and/or track the user. In addition, third parties may attempt to gain access to a private key and intercept information intended for a user to thereby compromise the integrity of the PKI security model.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

The anonymity of a user at a client computer may be preserved when authenticating with an on-line service or content provider through the use of an anonymous and verifiable (i.e., "blind") certificate set that is created by a certificate authority from a fixed-size set of PKI key pairs. The certificate authority randomly selects a subset of PKI key pairs from the fixed-sized set to generate the blind certificate set where each certificate in the set includes a respective public key from the PKI key pair subset. The certificate authority also sends the private keys from the PKI key pair subset to the user.

When the user authenticates with the on-line provider, the client computer is configured to randomly select a subset of one or more certificates from the set to present to the provider. The provider will verify the certificates and then encrypt content (or other data or information) using one or more public keys in the subset of certificates and the client computer will decrypt the content with the corresponding private keys for the user's consumption. As the certificate authority has a fixed-size set of PKI key pairs from which to create certificates, it will reuse public keys for certificates that are provided to other users. Due to the collisions that result from the key reuse, the on-line provider will be unable to uniquely identify or track the user using a public key from the certificate.

On-line security can be further enhanced when the subset of the user's blind certificate set used for authentication includes more than one certificate. For example, if the client presents multiple randomly selected certificates from the set to the provider, then the content can be bound to the multiple public keys in the certificates using sequential or other methods of encryption. The client can decrypt the content using the corresponding private keys to enable consumption by the user. While it may be possible that a particular user key is compromised, it is very unlikely that an eavesdropper or other third party will possess all the keys that comprise the random subset of the user's blind certificate set that would be needed to decrypt the content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
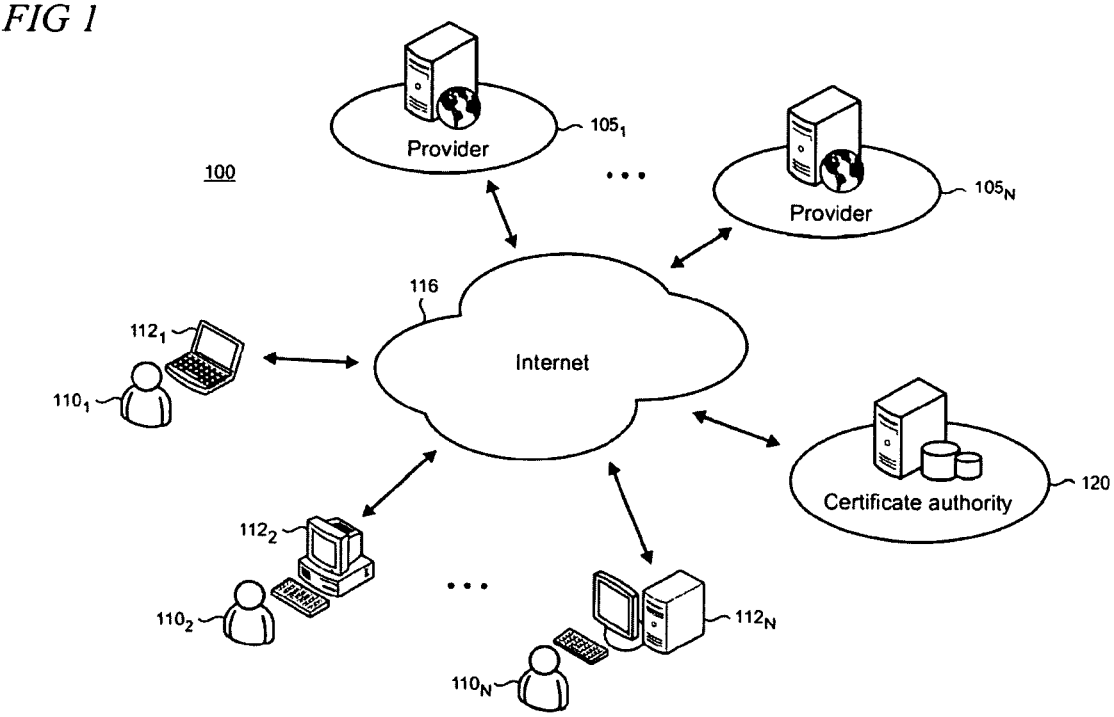
FIG. 1 shows an illustrative on-line environment that supports providers (e.g., service and/or content providers) that may be accessed by users at client computers over a network.

FIG. 1 shows an illustrative on-line environment 100 that supports a number of content or service providers $105_1 \ldots N$ that may be accessed by users $110_{1, 2 \ldots N}$ at respective client computers $112_{1, 2 \ldots N}$ over a network such as the Internet 116. The client computers 112 may comprise, for example, workstations, desktop and laptop PCs (personal computers), as well as mobile devices such as cell phones, handheld PCs and game devices, and the like.

The particular type of content or services furnished by the providers 105 may differ by implementation and could provide any of a variety of user experiences, services, transactions, or content such as information, video, audio, etc., that is delivered to a user 110 over the Internet 116. In this example, one of the providers $105_1$ is configured to provide media content such as video and music to registered users from the public who can select and download content on a subscription or per-item basis, typically in accordance with terms of use that may include, for example, digital rights management or other content-protection provisions. However, it is emphasized that this particular example is intended to be illustrative and the present arrangement for providing anonymous verifiable public key certificates is not limited to publicly accessible media content download services.

A certificate authority 120 is also supported in the on-line environment 100. The certificate authority 120 is configured as part of PKI infrastructure implementation in the environment 100 that uses a system of digital certificates, as described in more detail below, to verify and authenticate the validity of a user 110 that is involved in a transaction through the use of public key cryptography. In this example, the certificate authority 120 provides services on a third-party basis for the providers 105. However, in alternative implementations, a certificate authority may be locally implemented and associated with a given provider 105, particularly in cases, for example, when the provider 105 does not provide content or services to the public.

Figure 2:
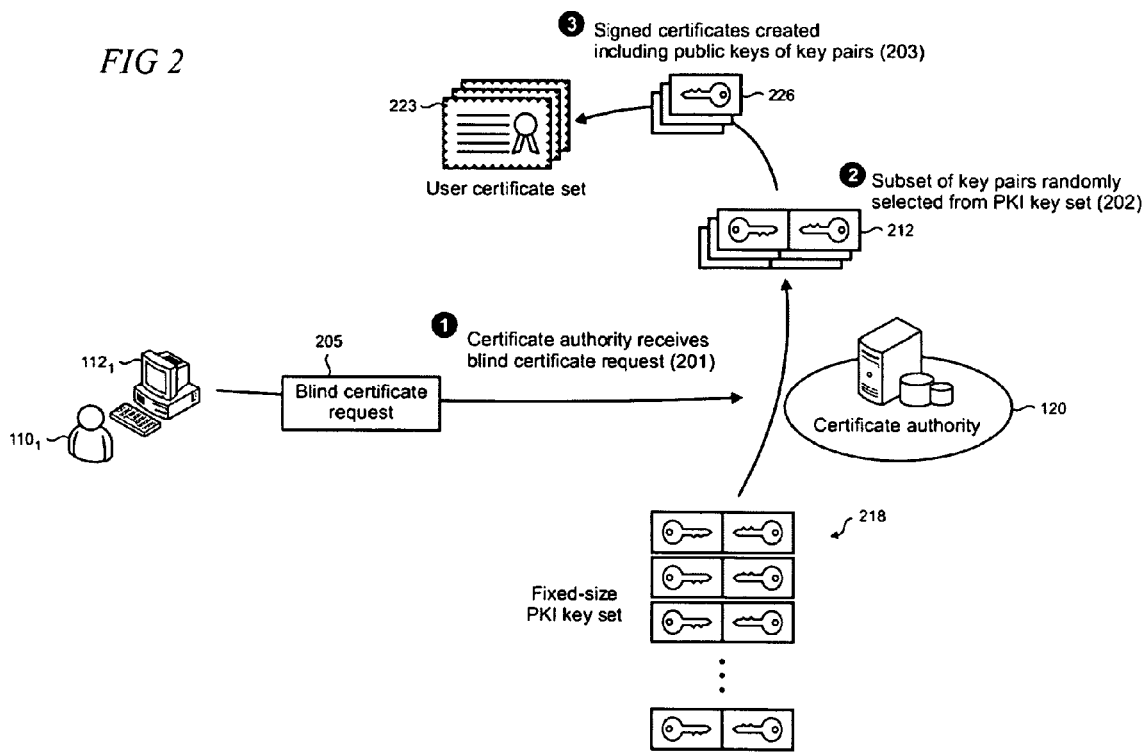
FIG. 2 shows an illustrative method for generating blind public key certificates.

FIG. 2 shows an illustrative method for generating anonymous verifiable public key certificates. Such certificates may be termed "blind certificates" because they provide anonymity to a user (represented by user $110_1$) when being authenticated by a provider. The method begins when the client computer $112_1$ makes a request 205 for a blind certificate which is received by the certificate authority 120 (as indicated by reference numeral 201). In some cases, the request 205 can be initiated by an action from the user $110_1$. For example, the user $110_1$ may be directed to obtain a blind certificate with the certificate authority 120 as part of a sign-up or registration procedure with the provider 105.

In some cases, the user $110_1$ may need to provide some identifying information to the certificate authority 120 in order to receive the blind certificate. However, the identifying information will typically be handled by the certificate authority 120 to preserve the user's anonymity with the provider 105.

When fulfilling the blind certificate request 205, the certificate authority 120 will begin the blind certificate generation by randomly selecting a subset of key pairs 212 for the user $110_1$ from a fixed-size PKI key set 218 (202). The particular size of the fixed-size PKI key set 218 can vary by implementation. However, the number of key pairs in the set 218 is selected so that key pairs will be intentionally reused among the users 110. Such reuse ensures global anonymity for the users 110 by virtue of keyset collisions. For purposes of this example only, and not as a limitation on the scope of the present arrangement, it will be assumed that the certificate authority 120 can select among 1,000 key pairs in the fixed-size PKI key set 218.

The subset of key pairs 212 that the certificate authority assigns to the particular user 110 will similarly be of a fixed-size. In this particular example, which should be not be construed as a limitation, the subset of key pairs 212 comprises 50 key pairs. From the 50 key pairs in the subset, the certificate authority 120 will generate a corresponding set of 50 signed certificates for the user $110_1$ (203). Each certificate in this user certificate set 223 will typically describe the access and usage rights of the user 110, or other limitations and terms of use/service with respect to a given provider 105. The description may also include a listing and/or a limitation on the number of authorized devices that may receive and render the downloaded media content. However, to ensure anonymity for the user 110, the description will typically not by itself reveal uniquely distinguishable information. The certificates in the set will also include respective public keys 226 from the subset of key pairs 212.

Figure 3:
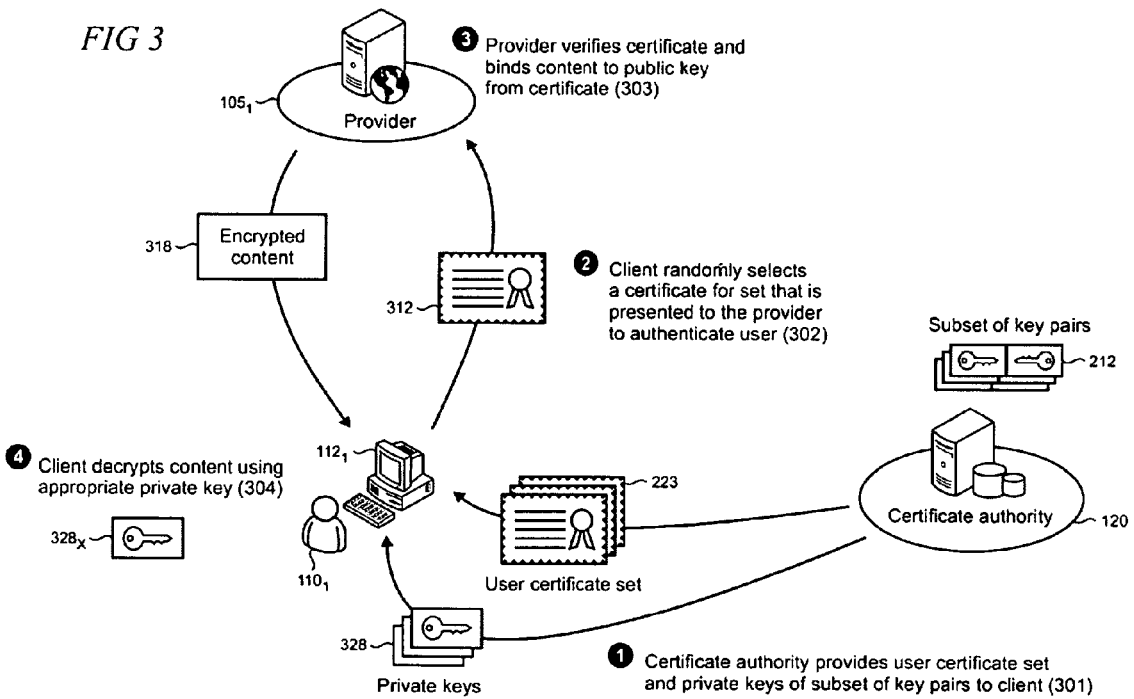
FIG. 3 shows an illustrative method by which a client presents a certificate to a provider and responsively receives encrypted content which can be decrypted and consumed.

As shown in FIG. 3, the certificate authority 120 provides the user certificate set 223 (comprising 50 signed certificates in this example) along with the private keys 328 from the subset of key pairs 212 (301). When the user $110_1$ attempts to access content (e.g., media content) from the provider $105_1$, an application or process executing on the client computer $112_1$ will randomly select a certificate 312 from the user certificate set 223 to present to the provider $105_1$ as part of the authentication of the user $110_1$ (302). The application or process can be implemented in various ways, depending on the requirements of a particular usage scenario, such as being part of a standalone client application that is used to implement access to the provider, or be implemented as a functionality of the operating system or other application, for example.

The provider $105_1$ will verify the certificate as being legitimate using conventional techniques and will bind the requested content to the public key from the certificate 312 (303) in order to encrypt it. The encrypted content 318 is transmitted to the client computer $112_1$ where it is decrypted by the client using the appropriate private key $328_X$ (304).

Because the PKI key set 218 (FIG. 2) that the certificate authority 120 uses to generate certificates is of a fixed size, it can be expected that some users will be provided with certificates that have the same public key. Depending on the size of the PKI key set 218 and the number of users that are serviced by the certificate authority 120, the same public key may be reused in certificates that are issued, for example, to hundreds, thousands, or even a larger number of users. The degree of public key reuse can be varied according to the needs of a particular implementation. The reuse of public keys among a number of users will make it difficult for the provider $105_1$ to uniquely identify or track the user $110_1$ because of the collisions among the commonly-used public keys.

The keyset collisions among multiple users thus provide global anonymity when authenticating with a provider 105. However, there may still be the potential for inappropriate or malicious actions that are targeted at a user 110. For example, if a user's keys get compromised or intercepted when distributed over the Internet, then it may be possible for an eavesdropper to decrypt the content that is intended for consumption by the user 110. This scenario may be addressed through use of a modification to the methodology that is shown in FIGS. 2 and 3 and described in the accompanying text.

Figure 4:
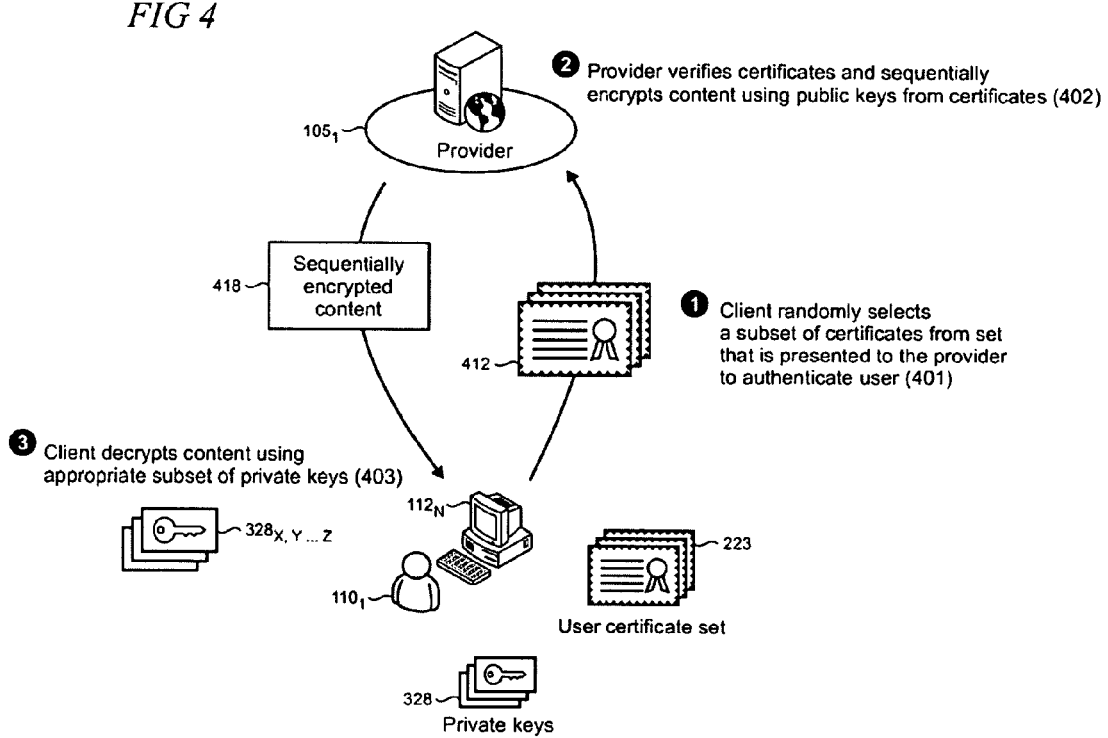
FIG. 4 shows an illustrative method by which a client presents multiple certificates to a provider and responsively receives serially encrypted content which can be decrypted and consumed.

The modified methodology enhances security of the user 110 against eavesdropping over the Internet (i.e., over the wire) by increasing the number of certificates from the user's certificate set 223 that are presented to the provider 105. An illustrative example is shown in FIG. 4. When the user $110_1$ attempts to access content from the provider $105_1$, an application or process executing on the client computer $112_1$ will randomly select a subset of certificates 412 from the user certificate set 223 to present to the provider $105_1$ as part of the authentication of the user $110_1$ (401). For example, and not as a limitation, the subset 412 can include five certificates from the user certificate set 223.

The provider $105_1$ will verify each of the certificates from the subset 412 and then bind the requested content to the five public keys from the subset to thereby encrypt the content prior to transmission to the user $110_1$ at the client computer $112_1$ (402). For example, a sequential binding algorithm may be used which follows the form:

Ciphertext=Encrypt5(Encrypt4(Encrypt3(Encrypt2(Encrypt1(plaintext)))))

Once sequentially encrypted, the content 418 is transmitted over the Internet. The client computer $112_1$ will then sequentially decrypt the content for consumption using the appropriate private keys $328_{X, Y \ldots Z}$ (403). In addition to sequential encryption, other encryption methodologies may also be utilized. For example, these methodologies may use any of a variety of algorithms that perform encryption as a function of a multiplicity of PKI key pairs.

As with the example shown in FIGS. 2 and 3, whichever particular encryption methodology is utilized, the provider $105_1$ will still have difficulty in uniquely identifying or tracking the user $110_1$ because of the collisions among the commonly-used public keys from the certificates in the subset 412. In addition, security over the wire is enhanced. While it might be possible that a given number of the user's keys are compromised and/or inappropriately possessed by others, the likelihood is very low that the specific five private keys needed to sequentially decrypt the user's content will be in the hands of an eavesdropper.

Figure 5:
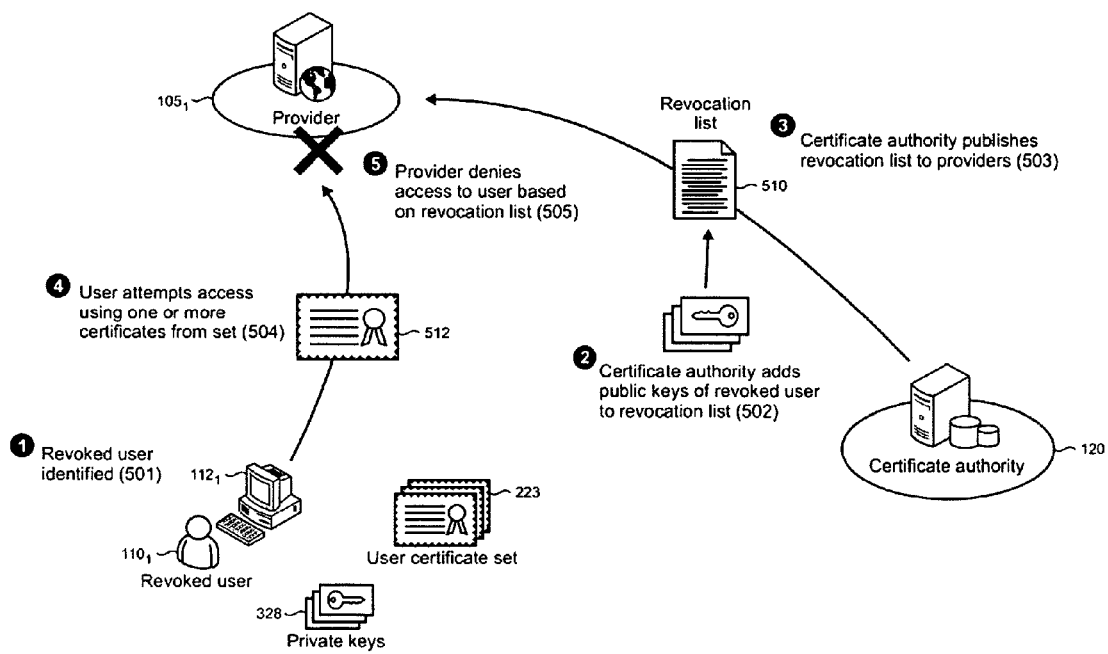
FIG. 5 shows an illustrative method by which a certificate authority may place a user on a revocation list.

FIG. 5 shows an illustrative method by which the certificate authority 120 may place a user (represented by user $110_1$) on a revocation list. This may be desired, for example, when the user $110_1$ has terminated a subscription to the service from the provider $105_1$, or is otherwise ineligible to access content/services from the provider. The revoked user $110_1$ is identified using the identifying information that was provided when the blind certificates were originally requested (501).

The certificate authority 120 will then add the revoked user's public keys to a revocation list 510 (502). The revocation list 510 is published to the providers 105 (503). If the user $110_1$ then attempts to access the provider $105_1$ using one or more certificates 512 from the user certificate set 223 (504), then the provider will deny access because the user's keys are on the revocation list 510 (505).

Using the illustrative quantities of 1,000 key pairs in the fixed-size PKI key set 218 (FIG. 2) and 50 key pairs used in the user certificate set 223 (FIG. 2), when the public keys from the revoked user $110_1$ are placed on the revocation list 510, five percent of the other users serviced by the certificate authority 120 who share the revoked public keys can also be expected to be denied access to the providers 105.

Figure 6:
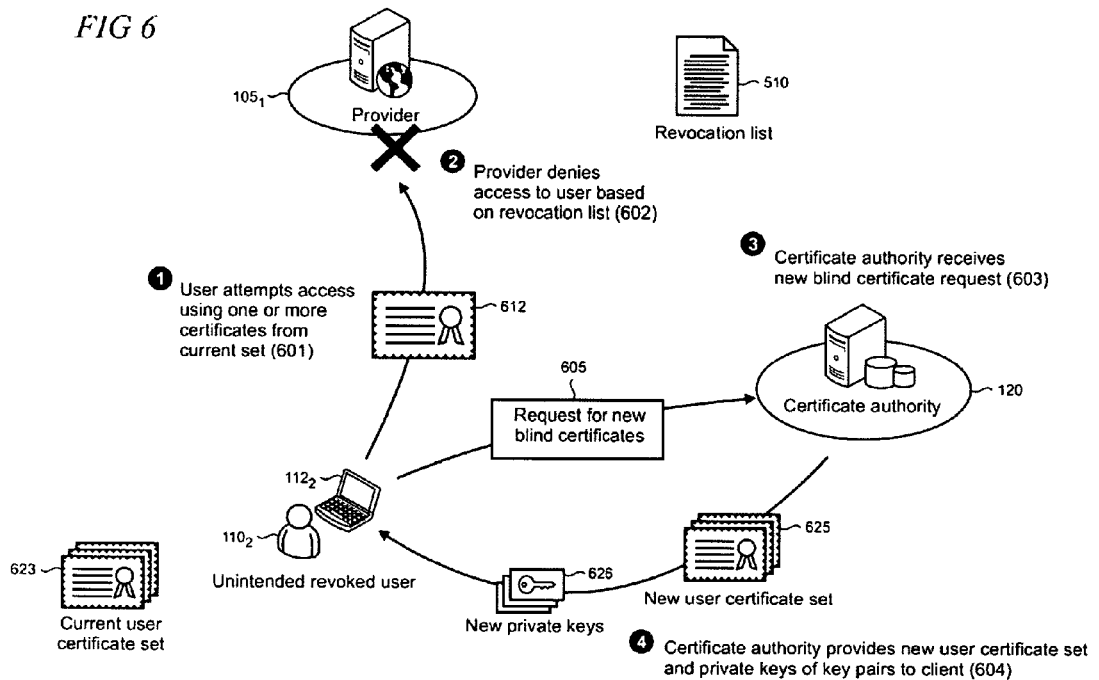
FIG. 6 shows an illustrative method by which an unintended revoked user may request new blind certificates from the certificate authority.

This scenario is illustrated in FIG. 6 where an unintended revoked user (represented by user $110_2$ at client computer $112_2$) attempts to access content or services from the provider $105_1$ by presenting one or more certificates 612 from the user's current certificate set 623 (601). The provider $105_1$ will deny access to the user $110_2$ because the public keys associated with the certificates 612 are included in the revocation list 510 (602).

However, as the user $110_2$ was not intended to be revoked, the user can simply make a request 605 to the certificate authority 120 for new blind certificates to replace the current user certificate set 623. When the certificate authority 120 receives the request 605 (603), it will check to see if the user $110_2$ is legitimately revoked or not. Because the user $110_2$ is not legitimately revoked in this scenario, the certificate authority 120 will provide a new user certificate set 625 having new public keys along with the corresponding private keys 626 to the user $110_2$ (604).

The user $110_2$ can then access the provider $105_1$ by presenting one or more of the new certificates. The provider $105_1$ will verify the certificates and bind content to the public keys which can be decoded by the client computer $112_2$ and consumed by the user $110_2$ in a similar manner as described above.

If a legitimately revoked user (e.g., user $110_1$ as shown in FIG. 5) makes a request to receive new certificates in a similar manner as the unintended revoked user $110_2$, the certificate authority 120 will not honor the request as a check will reveal that the user $110_1$ was intended to be revoked.

It is noted that while the above described illustrative scenarios and examples are provided using the context of access and authentication with content or service providers, the present arrangement for anonymous verifiable public key certificates should not be viewed as being limited to such specific contexts. For example, blind certificates may also be applicable to usage scenarios, applications, or implementations that generally involve verification of a member as part of some group or organization without having to reveal information that would enable tracking or unique identification of such member.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable medium, not consisting of a propagated signal, containing instructions which, when executed by one or more processors disposed in an electronic device, perform a method comprising the steps of: generating a set of blind certificates for a user in a population of users by a certificate authority:
    utilizing a fixed-size PKI key set that is accessed by the certificate authority for generating the set of blind certificates on a per-user basis, each of the blind certificates arranged to limit the discloser of identifying information pertaining to the user, each of the blind certificates in the set being verifiable and providing anonymity for the user when used for authenticating the user, the fixed-size PKI key set being sized smaller than the user population so that identical public keys are simultaneously and commonly provided to each of a plurality of users in the population to cause the occurrence of keyset collisions to prevent tracing of the users;
    randomly selecting a subset of key pairs from the fixed-size PKI key set on a per-user basis;
    generating each blind certificate in the set of blind certificates by using respective public keys from the subset of key pairs, each blind certificate including a description including a listing and/or a limitation on a number of authorized devices to receive and render downloaded media content; and
    providing the set of blind certificates and private keys from the subset of key pairs to the user.

2. The computer-readable medium of claim 1 in which the generating further includes signing each of the blind certificates.

3. The computer-readable medium of claim 1 in which each of the blind certificates further includes a description of at least one of access rights, usage rights, terms of use, terms of service, limitations, or authorized devices.

4. The computer-readable medium of claim 1 in which the method further includes the steps of identifying a user whose access rights are revoked and placing one or more of the public keys that are associated with the identified user on a revocation list.

5. The computer-readable medium of claim 4 in which the method further includes a step of publishing the revocation list to an authenticating party.

6. The computer-readable medium of claim 4 in which the method further includes a step of providing new blind certificates and private keys to a user having existing public keys on the revocation list but whose access rights are not legitimately revoked.

7. The computer-readable medium of claim 4 in which the method further includes a step of rejecting a request for new blind certificates and private keys from a user having existing public keys on the revocation list and whose access rights are legitimately revoked.

8. The computer-readable medium of claim 1 in which the public keys associated with the provided set of blind certificates are subject to revocation, the revocation utilizing a revocation list being shared between the certificate authority and a service provider.

9. A computer-readable medium, not consisting of a propagated signal, containing instructions which, when executed by one or more processors disposed in an electronic device, perform a method for using blind certificates among a population of users, the method comprising the steps of:
generating a set of blind certificates for a user in the population of users by a certificate authority
making a request to a certificate authority for blind certificates;
receiving a set of blind certificates from the certificate authority, the blind certificates being generated on a per-user basis using public keys from a randomly selected subset of key pairs of a fixed-size PKI key set, each of the blind certificates arranged to limit the disclosure of identifying information pertaining to the user, and the blind certificates further being verifiable and providing anonymity for the user when used to authenticate the user, the fixed-size PKI key set being sized smaller than the user population so that identical public keys are simultaneously and commonly provided to each of a plurality of users in the population to cause the occurrence of keyset collisions to prevent tracing of the users;
presenting more than one blind certificate from the set from the user to the authenticating party so that the authenticating party authenticates the user using the more than one blind certificates; and
receiving content that is encrypted using public keys from each of the corresponding more than one presented blind certificates presented in said presenting step.

10. The computer-readable medium of claim 9 in which the method further includes a step of receiving private keys from the subset of key pairs from the certificate authority.

11. The computer-readable medium of claim 10 in which the method further includes a step of decrypting the encrypted content using respective one or more private keys.

12. The computer-readable medium of claim 11 in which the method further includes a step of rendering the decrypted content on the electronic device.

13. The computer-readable medium of claim 9 in which the authenticating party is selected from one of content provider, service provider, or an organization to which the user seeks to be authenticated as a member.

14. The computer-readable medium of claim 9 in which the request is made in an automated manner as part of a registration procedure with a service provider or content provider.

15. The computer-readable medium of claim 9 in which the-public keys associated with the received set of blind certificates are subject to revocation, the revocation utilizing a revocation list being shared between the certificate authority and an authenticating party.

16. A computer-readable medium, not consisting of a propagated signal, containing instructions which, when executed by one or more processors disposed in an electronic device, perform a method comprising the steps of:
authenticating a user in a population of users with blind certificates by an authenticating party,
receiving more than one blind certificate from a user seeking to be authenticated, each of the blind certificates arranged to limit the disclosure of identifying information pertaining to the user, the blind certificates being generated by a certificate authority on a per-user basis using public keys from a randomly selected subset of key pairs of a fixed-size PKI key set and being signed by the certificate authority with a signature, the fixed-size PKI key set being sized smaller than the user population so that identical public keys are simultaneously and commonly provided to each of a plurality of users in the population to cause the occurrence of keyset collisions to prevent tracing of the users;
verifying the more than one blind certificates;
authenticating the user using the verified more than one blind certificates; and
binding content to more than one of the public keys so as to encrypt the content where the encrypted content is decrypted using corresponding multiple private keys from the subset of key pairs and consumed by the user.

17. The computer-readable medium of claim 16 in which the encryption is performed by binding the content to two or more public keys in a sequential manner.

18. The computer-readable medium of claim 16 including a further step of transmitting the encrypted content to the user over a network.

19. The computer-readable medium of claim 16 in which the encryption is performed as a function of a multiplicity of PKI key pairs.

20. The computer-readable medium of claim 16 in which the user is authenticated in association with downloading of media content under digital rights management provisions.

21. The computer-readable medium of claim 16 in which the public keys associated with the received set of blind certificates are subject to revocation, the revocation utilizing a revocation list being shared between the certificate authority and an authenticating party.

* * * * *